Patented Nov. 19, 1929

1,735,958

UNITED STATES PATENT OFFICE

HENRY DREYFUS, OF LONDON, ENGLAND

ACETIC ANHYDRIDE

No Drawing. Application filed April 3, 1926, Serial No. 99,662, and in Great Britain April 9, 1925.

This invention relates to the manufacture of acetic anhydride from acetic acid.

It is known that acetone can readily be obtained by passing acetic acid vapour over certain heated catalysts or contact materials, such for example as oxides or carbonates of metals whose acetates give acetone on pyrogenic decomposition, for example barium carbonate, calcium carbonate, zinc oxide and the like, zinc dust or cadmium, aluminium, iron, lead in finely divided form, or iron turnings. The formation of acetone is facilitated by the presence of water, and for this reason dilute acetic acid is often employed for carrying out the reaction in practice.

The formation of acetic anhydride has not hitherto been observed in passing acetic acid vapour over heated catalysts such as are known to promote or favour the formation of acetone.

It has been stated in literature describing the formation of acetic anhydride by passing acetic acid vapour over hot catalysts, that substances known to catalyze the formation of acetone from acetic acid will not cause the formation of acetic anhydride, and that their presence must be avoided in the catalyst zone.

I have found that acetic anhydride may be readily obtained by passing acetic acid vapour over heated catalysts such as normally promote the formation of acetone, provided that glacial acetic acid or acetic acid of high concentration is used and provided that the reaction is performed at temperatures insufficiently high to cause the formation of acetone or substantial quantities of acetone, and provided that the catalyst or contact material is free or substantially free from water. Especially favourable yields of acetic anhydride are obtained if the reaction vapours are subjected to fractional condensation on leaving the reaction zone, and the employment of reduced pressure or vacuum in the system also aids the production and recovery of the anhydride.

By subjecting the hot reaction vapours from the reaction zone to fractional condensation the anhydride may be separated immediately from water vapour formed in the reaction which is of especial advantage.

It will be noted that, whereas in the process for forming acetone from acetic acid, the best results have been obtained when using dilute acetic acid, the use of glacial or high percentage acetic acid is esesntial for the process of the present invention. For obtaining the best yields of acetic anhydride by the process of the present invention, the speed of passage of the vapours should be regulated so as to avoid substantial decomposition of the vapours into gaseous products, which decomposition is more especially liable to occur with low speeds of passage of the vapours. The higher the temperature, the higher should be the speed of passage of the vapours.

As catalysts I may employ any substances which have been hitherto used for, or are capable of forming acetone from acetic acid, for example, oxides or carbonates of the metals whose acetates yield acetone on pyrogenic decomposition, for instance barium carbonate, calcium carbonate, zinc oxide, tin oxide, or the like, or zinc dust, cadmium, aluminium, iron, lead in finely divided form, or iron turnings.

The temperature at which the reaction is performed varies considerably with the catalysts employed. As before stated one uses temperatures insufficiently high to cause the formation of acetone or substantial quantities of acetone. Temperatures of about 300° to 500° (or even considerably lower than 300° C.) should be employed, and temperatures higher than these should preferably not be used. With catalysts such as barium oxide or zinc oxide or tin oxide, lower temperatures should be employed than with other catalysts.

The acetic anhydride may be recovered from the crude reaction product in any suitable way. Preferably as before mentioned it is recovered by fractional condensation of the vapours on their leaving the reaction zone, for example by leading the hot reaction vapours upwards through fractionating columns whereby the anhydride may be separated from the water formed by the reaction. If not recovered by fractional condensation the anhydride is preferably recovered from the crude reaction product by subjecting the latter to fractional distillation over dry sodium acetate under vacuum.

As before mentioned, the reaction vapours may with advantage be subjected to fractional condensation on leaving the reaction zone, in order at once to separate the acetic anhydride from water vapour formed in the reaction. For example the hot reaction gases may pass immediately to any suitable apparatus, for instance up through a fractionating column or series of fractionating columns in which said separation may be effected. In order to effect the separation of the anhydride from the water vapour, the fractionating column or columns or other apparatus used for the fractional condensation should be maintained at temperatures higher than the boiling point of water at the pressure obtaining therein, and preferably intermediate between the boiling points of acetic anhydride and water under the conditions of pressure obtaining. Reduced pressure or vacuum is preferably employed. The water vapour may be allowed to escape; or if desired it may in turn be condensed or otherwise treated to recover any acetic acid or acetic anhydride remaining in it.

It will of course be understood that the fractional condensation of the hot reaction vapours may be conducted so as to separate anhydride to any desired extent from any unconverted acetic acid.

The following are some examples illustrating how the invention may be performed, it being understood that these are only illustrative and can be varied widely without departing from the invention.

*Example 1*

Glacial acetic acid vapour is passed at ordinary pressure or under reduced pressure over dry barium oxide or dry zinc oxide heated to about 250°–300° C., and the acetic anhydride so formed is recovered by leading the hot reaction gases or vapours upwards through one or more fractionating columns whereby the acetic anhydride or acetic anhydride and unconverted acetic acid is or are condensed out from water vapour formed in the reaction, the fractionating column or columns, preferably maintained under reduced pressure or vacuum, being kept at a temperature or temperatures above the boiling point of water at the pressure existing and intermediate between the boiling points of water and of acetic anhydride under the conditions of pressure obtaining.

*Example 2*

Glacial acetic acid vapour is passed at ordinary pressure or under reduced pressure over either zinc dust, cadmium, aluminium, iron, lead in finely divided form, or iron turnings heated to about 300°–500° C., and the acetic anhydride so formed is recovered as in Example 1.

What I claim and desire to secure by Letters Patent is:—

1. Process of manufacturing acetic anhydride which comprises passing acetic acid vapors substantially free of water, over heated catalysts which promote the formation of acetone, at a temperature insufficiently high to cause acetone formation, the catalysts employed being substantially free from water.

2. Process of manufacturing acetic anhydride which comprises passing glacial acetic acid vapors over metallic catalysts which promote the formation of acetone in finely divided form, at a temperature insufficiently high to cause acetone formation, the catalysts employed being substantially free from water.

3. Process of manufacturing acetic anhydride which comprises passing glacial acetic acid vapors over metallic catalysts which promote the formation of acetone in finely divided form at a temperature insufficiently high to cause acetone formation and under reduced pressure, the catalyst employed being substantially free from water.

4. Process of manufacturing acetic anhydride which comprises passing glacial acetic acid vapors over zinc dust at a temperature insufficiently high to cause acetone formation, the zinc dust being substantially free from water.

5. Process of manufacturing acetic anhydride which comprises passing glacial acetic acid vapors over zinc dust at a temperature insufficiently high to cause acetone formation under reduced pressure, the zinc dust being substantially free from water.

6. Process of manufacturing acetic anhydride which comprises passing glacial acetic acid vapors over a metallic catalysts which promote the formation of acetone in finely divided form at a temperature between 250° C. and 500° C., the catalyst employed being substantially free from water.

7. Process of manufacturing acetic anhydride which comprises passing acetic acid vapors, substantially free of water, over heated catalysts which promote the formation of acetone, at a temperature insufficiently high to cause acetone formation, the catalyst employed being substantially free from water and subjecting the reaction vapors to fractional condensation on leaving the reaction zone, thereby separating the acetic anhydride from the water formed in the reaction.

8. Process of manufacturing acetic anhydride which comprises passing glacial acetic acid vapors over metallic catalysts which promote the formation of acetone in finely divided form at a temperature insufficiently high to cause acetone formation, the catalysts employed being substantially free from water, and subjecting the reaction vapors to fractional condensation on leaving the reaction zone, thereby separating the acetic anhydride from the water formed in the reaction.

9. Process of manufacturing acetic anhydride which comprises passing glacial acetic acid vapors over metallic catalysts which promote the formation of acetone in finely divided form at a temperature insufficiently high to cause acetone formation and under reduced pressure, the catalyst employed being substantially free from water, and subjecting the reaction vapors as they leave the reaction zone to fractional condensation under reduced pressure, thereby separating the acetic anhydride from the water formed in the reaction.

10. Process of manufacturing acetic anhydride which comprises passing glacial acetic avid vapors over metallic catalysts which promote the formation of acetone in finely divided form at a temperature between 250° C. and 500° C., the catalyst employed being substantially free from water and subjecting the reaction vapors to fractional condensation on leaving the reaction zone, thereby separating the acetic anhydride from the water formed in the reaction.

In testimony whereof I have hereunto subscribed my name.

HENRY DREYFUS.